Figure 1:
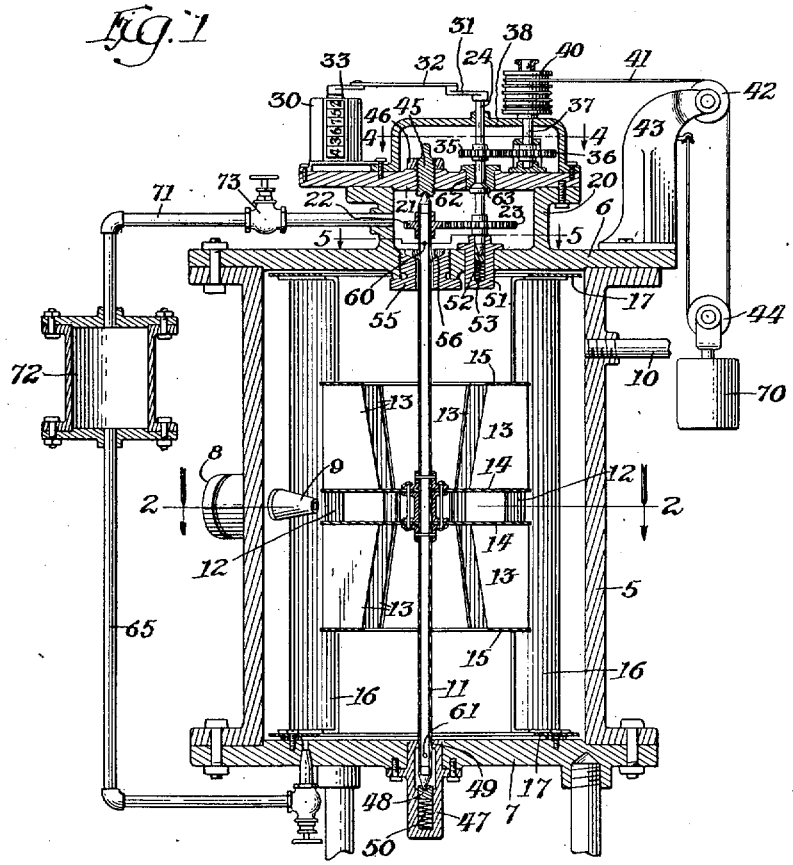

E. P. COLEMAN, DEC'D.
R. H. COLEMAN, ADMINISTRATOR.
FLUID METER.
APPLICATION FILED JULY 6, 1909.

986,423.

Patented Mar. 7, 1911.

2 SHEETS—SHEET 1.

Witnesses:
J. H. Alfred
L. M. Daggett

Inventor:
Edgar P. Coleman
by Poole & Brown
Attys

UNITED STATES PATENT OFFICE.

EDGAR P. COLEMAN, OF BUFFALO, NEW YORK; ROBERT H. COLEMAN ADMINISTRATOR OF SAID EDGAR P. COLEMAN, DECEASED.

FLUID-METER.

986,423.     Specification of Letters Patent.     Patented Mar. 7, 1911.

Application filed July 6, 1909. Serial No. 506,025.

*To all whom it may concern:*

Be it known that I, EDGAR P. COLEMAN, a citizen of the United States, and a resident of Buffalo, in the county of Erie and State of New York, have invented certain new and useful Improvements in Fluid-Meters, (Case C;) and I do hereby declare that the following is a full, clear, and exact description thereof, reference being had to the accompanying drawings, and to the letters of reference marked thereon, which form a part of this specification.

This invention relates to integrating meters for determining and registering the quantity or volume of fluid, whether liquid, vapor or gas, which passes through a pipe or conduit during a given unit of time, irrespective of the density or rate of flow of the fluid.

An apparatus embodying the main features of my invention consists in general of a motor operated by the pressure of the fluid to be measured, and the speed of which varies with the pressure-head or velocity of the fluid, and a registering device operated by said motor, together with means for neutralizing the friction due to the movement of the operative parts of the motor, said means embracing a separate motor operated through the action of a descending weight or other source of power, and acting on the rotative member of the motor with a constant force exactly equal to the resistance to the movement of the motor due to friction, so that inaccuracy in calibration due to varying frictional resistance at different speeds is entirely eliminated. By the use of such friction-neutralizing means the speed of the motor is made exactly proportional to the velocity of the fluid, and the calibration is therefore accurate regardless of the frictional resistance developed in the operation of the motor.

My invention may be most advantageously carried out in practice by the use of a motor of the impact or reactive type, in which rotary motion is imparted to a rotative member or wheel by the force of a jet of fluid issuing from a jet-nozzle and which includes a resistance or load-member connected and turning with the said rotative member or wheel, and which turns in a body of fluid, thereby affording a resisting torque opposing the motive-torque of the motor, so that the latter turns or rotates at a moderate rate of speed. The registering device is driven by said rotative member or wheel and indicates the number of rotations thereof in a given period of time, and consequently the total volume or quantity of fluid passing through the apparatus in such given period. For securing the desired result of accuracy in calibration, under varying conditions of pressure or velocity and density in the fluid to be measured, I employ in the motor a jet-nozzle which has a converging passage or bore terminating in a cylindrical or parallel-discharge exit or delivery orifice, a nozzle so made having a constant co-efficient of discharge. In a motor thus constructed, the torque of the motor-wheel is proportional to the square of the fluid velocity at the exit orifice of the nozzle, while the resisting-torque of the load-member is proportional to the square of the speed of rotation of the same, with the result that the speed of rotation of the wheel is strictly proportional to the square root of the pressure-head of the fluid and, therefore, to the velocity of discharge through the nozzle. The frictional resistance to the rotation of the moving parts being eliminated by the use of a friction-neutralizing device or constant-power motor, as described, the meter will be accurate for all rates of flow and under all variations in density of the fluid to be measured.

The apparatus shown in the accompanying drawings as embodying my invention embraces a motor of the impact type, consisting of a closed casing, a rotor or wheel within the same, mounted on a vertical shaft and provided with blades or buckets, horizontally arranged jet-nozzles and a resistance or load-member consisting of blades attached to the rotor and turning in the body of fluid within the casing, said apparatus corresponding in its general features with that illustrated in a separate application for Letters Patent, Serial Number 506,023, filed simultaneously herewith. I have, however, illustrated in said drawings certain details of construction which are themselves novel, and which are hereinafter described.

Figure 2:
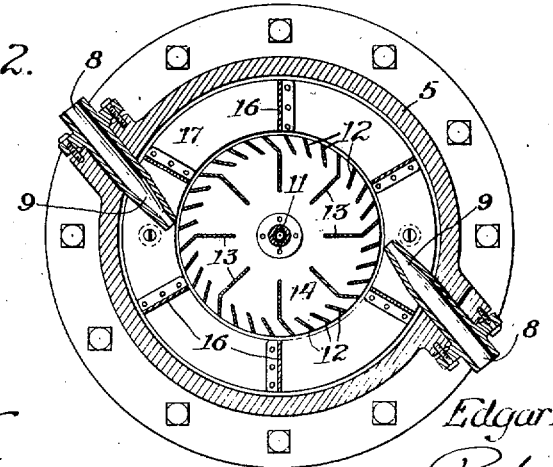

In the said drawings:—Figure 1 is a view in central, vertical section of an apparatus embodying my invention. Fig. 2 is a horizontal section of the same, taken on line 2—2 of Fig. 1. Fig. 3 is a plan view of the apparatus. Fig. 4 is a detail section taken on line 4—4 of Fig. 1. Fig. 5 is a detail section taken on line 5—5 of Fig. 1. Fig. 6 is an enlarged detail section of the upper shaft-bearing taken on line 6—6 of Fig. 5. Fig. 7 is an enlarged detail section of said bearing taken on line 7—7 of Fig. 5. Fig. 8 is a plan view showing a modified form of said upper shaft-bearing.

As shown in said drawings, the casing of the apparatus consists of an upright cylinder 5 provided with top and bottom heads 6 and 7. The fluid to be measured enters the casing through two supply pipes 8, 8 (Fig. 2) which extend through the cylinder 5 at opposite sides thereof and terminate in tapered, horizontally arranged discharge nozzles 9, 9. The fluid passes from the casing through a discharge pipe 10, the flow of the fluid through the casing being constant during the operation of the apparatus. Centrally within the casing is an upright rotative shaft 11, carrying the rotor or rotative member of the apparatus, which embraces a series of annularly arranged blades or buckets 12, 12, 12 that are acted upon by the jets of fluid from the nozzles 9, 9 and two annularly arranged series of blades or wings 13, 13. The blades or buckets 12, 12, 12, together with the nozzles 9, 9, constitute the operative elements of an impact motor, said blades and nozzles being arranged obliquely with respect to radial lines of the rotor, and the nozzles being so arranged that the jets delivered thereby act by impact on the said blades to give rotative movement to the rotor, as common in impact motors. Said nozzles have converging parallel-discharge orifices, the bores of said nozzles being conical in their tapered parts and terminating in cylindrical orifices at their discharge ends. Nozzles of this form have a substantially constant co-efficient of discharge under a varying pressure-head and with fluids of varying density. The two sets of blades 13, 13 of the rotor rotate, with the motor blades 12, 12, 12, within the body of fluid contained in and passing through the casing, and constitute a load-member or fluid-brake which furnishes a resistance-torque opposing the motive-torque of the motor. The torque of the rotor is proportional to the pressure head, or to the square of the velocity of the fluid, and the resistance-torque of the load-member is proportional to the square of its revolutions per unit of time, while the resisting-torque will to a large degree counterbalance the motive-torque, so that the rotor will turn at a moderate rate of speed. The resulting rate of rotation of the rotor will, therefore, be proportional to the fluid flow through the apparatus irrespective of variation of pressure or density of the fluid being measured; the error which would arise from the constant frictional resistance, due to the turning of the rotor and gearing, being eliminated by the friction-neutralizing device or constant-torque motor hereinafter described.

In the particular construction in the rotor shown in the drawings, the same embraces two parallel sheet metal disks 14, 14 which are secured to the shaft 11 and the motor blades 12, 12, 12 which are affixed to and extend between the marginal parts of said disks. The load-member blades 13, 13 are arranged radially and consist of upright plates that are inserted through the said disks 14, 14 and extend above and below the same; the upper and lower ends of said plates being secured to flat sheet metal rings 15, 15.

In order to prevent the body of fluid within the casing from turning with the rotor as the latter revolves, annularly arranged, stationary radial blades 16, 16, 16 are located within the casing exterior to the rotor, as clearly seen in Fig. 2. Said stationary blades, by holding from rotary motion the body of fluid surrounding the rotor, greatly increase the resistance to rotation produced by the action on the fluid of the load-member blades. For convenience of construction, the stationary blades 16, 16, 16 are shown as attached at their upper and lower ends to flat rings 17, 17, thereby forming a cage or frame which is inserted, as a whole, into the casing and is secured by screws or otherwise to the lower head 7 of the said casing.

At the top of the main casing is an oil-chamber formed by means of an auxiliary casing consisting of a cylindrical wall 20 which rises from the upper head 6 of the main casing, and a cap-plate 21 secured to the wall 20. The motor-shaft 11 extends at its upper end into said oil-chamber and operates a registering device located outside of the casing. The said shaft 11 passes upwardly through a bearing on the top wall 6, into the oil-chamber and in its part within the same is provided with a gear-wheel 22 which intermeshes with a gear wheel 23 attached to a vertical shaft 24 which extends upwardly through the cap 21 of the oil-chamber. A register or rotating counter 30, of familiar construction, is mounted on the cap 21 of the oil-chamber and is operated from the shaft 24 through the medium of a crank-arm 31, on the upper end of said shaft, and a connecting rod 32 which is engaged with said crank-arm and with an oscillating crank-arm 33 forming part of the registering device. The said register or counter will be operated to turn the units disk thereof one space or units distance at each rotation of the shaft 24 so that said register will indicate the number of rotations of the said shaft per unit of time. The quantity or voluof fluid which passes through the nozzles to effect each rotation of the rotor being easily determined, it follows that the device may be constructed to directly indicate the total quantity of fluid which flows through the apparatus in a given time, expressed in any desired unit of measurement.

The constant-torque motor which is applied, in the apparatus illustrated, to neutralize the frictional torque of the rotor and its shaft and gearing embraces features of construction as follows: To the shaft 24, above the cap 21, is attached a gear-wheel 35 which intermeshes with a gear-wheel 36 on an upright shaft 37 mounted on said cap-plate 21. As shown, a shell or casing 38 is attached to said plate and affords bearings for the shaft 37 and for the upper end of the shaft 24. On said shaft 37, above the casing 38, is secured a drum 40 on which is wound a rope or cord 41. Said rope or cord 41 passes from the drum 40 over a guide-pulley 42 mounted on a bracket 43 attached to the top plate 6 of the casing. From the guide-pulley 42 the cord 41 passes around a pulley 44 attached to a weight 70, the extremity of said cord being attached to the bracket 43. The parts thus constructed constitute a weight-actuated motor by which a constant torque is transmitted to the shaft 11 through the medium of the gearing described acting in the same direction as that in which the said shaft turns in the operation of the motor; such constant-torque being adapted, by proper adjustment of the gravity of the weight and proportioning of the gearing, to give exactly the amount of power required for overcoming the frictional resistance due to the turning of the parts of the motor and registering mechanism in their bearings.

The bearing for the upper end of the rotor shaft 11 consists of a bearing plug 45 which is inserted through and has screw-threaded connection with the cap 21 of the oil-chamber; the said shaft having a conical upper end engaging a conical recess in the lower end of the bearing plug. Said bearing plug may be adjusted vertically by turning it in the cap 21 and a jam-nut 46, applied to its screw-threaded upper end and bearing on the top surface of the said cap, locks or holds the same from turning or shifting when adjusted. The bearing for the lower end of the rotor-shaft embraces an upright cylindrical sleeve 47 which is secured to the lower head 7 of the casing and extends at its upper end through a central aperture in said head. Said sleeve 47 is closed at its lower end and is provided in its lower part with a vertically sliding plug 48 provided in its top with a conical recess for engagement with the lower, conical end of the shaft 11. Said lower end of the shaft enters the said sleeve and has bearing laterally in a cylindrical bearing surface 49 formed at the upper end of the bore or central passage of the sleeve. The sliding plug 48 constitutes a thrust bearing and is held or pressed upwardly into contact with the lower conical end of the shaft by a coiled spring 50, interposed between the said plug and the lower end of the bore of the sleeve. Said sleeve is enlarged below the bearing surface 49 so as to form an oil space which surrounds the lower end of the shaft above the sliding plug 48.

The shaft 24 has bearing at its lower end in a bearing sleeve 51 secured in an opening formed in the top head 6 of the main casing. The sleeve 51 is provided with a cylindrical bore to receive the lower end of said shaft, and in the lower part of said bore is located a vertically sliding plug 52 provided in its top with a conical bearing recess to engage the conical lower end of said shaft. A coiled lifting spring 53 presses the said plug upwardly in the bearing sleeve and holds said bearing plug in engagement with said conical lower end of the shaft. A bearing is formed for the shaft 24 on the cap 21 of the oil-chamber, through which said shaft 24 extends, by means of a tubular bearing sleeve 62 which surrounds the shaft and is inserted and secured in an aperture in said cap, together with a bearing collar 63 on said shaft which is located below the bearing sleeve 62 and has an upwardly facing conical bearing surface engaging an annular, conical, downwardly facing bearing surface on the lower end of said sleeve. The spring 53, acting through the plug 52, lifts the shaft 24 and holds the bearing collar 63 in contact with the bearing surface on said sleeve 62. The bearing collar 63, being held or pressed constantly against the lower end of the bearing sleeve 62, a tight joint is maintained, by which the escape of oil from the reservoir between the shaft 24 and the cap 21 is prevented.

Oil is supplied to the oil-chamber by means of a supply pipe 71 receiving its supply of oil from a reservoir 72. A valve 73 is provided in the pipe 71 to control the flow of oil or lubricant from the reservoir to the oil-chamber. The oil or other lubricant supplied to the oil-chamber by the pipe 71 fills said oil-chamber so that the said upper bearing of the shaft 11, as well as the bearings of the shaft 24 and the gear-wheels 22 and 23, are immersed or run in an oil bath. Said oil-reservoir serves to supply lubricant to the oil-chamber to take the place of oil that may escape therefrom by leakage or otherwise.

In order to separate or isolate the body of oil in the oil-chamber from the fluid contained in and passing through the casing a bearing is provided between the motor-shaft 11 and the top wall 6 of the casing which constitutes a suspension bearing by which the weight of the shaft and attached parts is supported, as follows: A tubular plug 55 surrounds the motor shaft and is inserted and secured in an aperture in the top wall 6; said plug thereby forming a part of said top wall. As shown and preferably constructed, the plug 55 has the form of a screw-plug, having screw-threaded connection with the aperture in the top wall. Said tubular plug has its central bore or aperture slightly larger than the diameter of the shaft so that the latter has no direct or frictional contact with said plug. Attached to and surrounding the motor-shaft, concentrically therewith, is a bearing disk 56 which is located above and rests upon an annular bearing surface upon the upper end of the screw-plug 55. Said bearing surface on the screw-plug is made of concave form and the lower surface of the disk 56 is made of convex form and of corresponding curvature. Said disk 56 is provided, as clearly shown in Figs. 5 and 6, with a plurality of radial slots 57, 57 extending from its outer margin inwardly, but terminating at their inner ends exterior to the central aperture in the plug 55. Said slots 57, 57 permit access of lubricant in the oil-chamber to the bearing surfaces of the screw-plug and the disk, the lubricant being always in contact with the bearing surface on the plug in the spaces that are left uncovered by the said slots, so that the lubricant is wiped between the bearing surfaces as the disk revolves with the shaft. Said disk 56 is also provided in its lower surface with radial grooves 58, 58 located between the radial slots 57, 57, said grooves 58 serving to aid in the distribution of the lubricant in a radial direction upon the bearing surfaces of the plug and disk. As shown in Figs. 5 and 6, said radial grooves 58 extend from points near the periphery of the disk 56 inwardly to the shaft, so that they permit the lubricant, which accumulates in said grooves as the disk rotates, to reach the inner margin of the annular bearing surface on the plug. In Fig. 8, wherein the bottom surface of said disk 56 is shown, the radial notches 57, 57 extend only about half way from the margin of the disk to the shaft, while the grooves 58, 58 terminate at their inner ends at some distance outwardly from the shaft.

In both forms of construction described, the radial notches and grooves are adapted to insure the distribution of oil or lubricant over substantially the entire area of the bearing surfaces of the disk and plug, without establishing any open connection between the oil-chamber and the main casing.

The disk 56 rests and turns on the bearing plug 55 under the weight of the shaft and attached parts, but is also held in engagement therewith, against any upward pressure exerted on the disk by the fluid in the casing, by means of the bearing plug 45, at the upper end of the motor-shaft, which is adjusted to properly engage the said upper end of the shaft and to maintain the disk 56 in free running contact with the top or bearing surface of the screw-plug. Such adjustment of the upper bearing plug is not interfered with by the lower bearing plug 48, for the reason that the spring 50 permits said lower bearing plug to adjust itself to the vertical position of the shaft when the said upper bearing plug 45 is so adjusted.

To provide for supplying oil to the lower bearing of the shaft 11, said shaft is made hollow or tubular and near its upper end is provided with a lateral aperture 60 through which lubricant from the oil-chamber may enter the longitudinal passage in the shaft. At its lower end, below the point at which the shaft engages the annular bearing surface 49 on the bearing sleeve 47, and above its conical lower end, the said shaft is provided with a lateral aperture 61 through which oil passing downwardly through the shaft escapes into the oil-space within said bearing sleeve. A body of lubricant is thus retained in the space referred to, by which the lower shaft-bearing is constantly lubricated.

In order to avoid possibility of leakage through the bearing formed by the disk 56 and the plug 55, in cases where the fluid to be measured is supplied to the casing under a considerable head or pressure, or where there are extreme variations of pressure within the casing, provision is made for equalizing the pressure between the main casing and the oil-chamber as follows: The interior of the reservoir 72 is connected with the interior of the main casing by means of a pipe 65. In the apparatus illustrated, which is designed for use in connection with water, or other liquid heavier than oil, the pipe 65 is connected with the bottom wall of the main casing and opens into the bottom of the oil-reservoir, while the supply pipe 71 is connected with or opens from the top of said oil-reservoir. In this particular arrangement of the parts the oil in the reservoir will be subjected to the same pressure as that within the casing, the water, or other liquid heavier than oil, rising through the equalizing pipe 65 and acting on the bottom of the body of oil in the reservoir to force the same from said reservoir into the oil-chamber. The pressure equalizing device described not only avoids undue pressure on the bearing between the shaft and the head of the casing and avoids liability of leakage through said bearing, but also takes care of any expansion or contraction of the lubricant in the oil-chamber.

An apparatus embodying the main or essential features of my invention may be variously modified with respect to details of construction and I do not, therefore, desire to be limited to the features of construction illustrated in the accompanying drawings except so far as the same may be in themselves novel and set forth in the accompanying appended claims as parts of my invention.

I claim as my invention:—

1. In an integrating fluid meter, the combination of a motor operated by the fluid to be measured, a registering device, means affording driving connection between the motor and the registering device, a constant-torque motor, and means connecting the constant-torque motor with the driven parts of the meter, said constant-torque motor acting to neutralize the frictional resistance of said driven parts.

2. In an integrating fluid meter, the combination of a rotative motor-member, a registering device, means affording driving connection between said motor-member and the registering device, a constant-torque motor, and means connecting said constant-torque motor with the rotor member, said constant-torque motor acting to neutralize the frictional resistance torque of said motor-member and the parts actuated thereby.

3. In an integrating fluid meter, the combination of a jet-nozzle, a rotor operated by the discharge through said nozzle of the fluid to be measured, a registering device, means affording driving connection between said rotor and the registering device, a constant-torque motor, and means connecting the said constant-torque motor with the rotor member, said constant-torque motor acting to neutralize the frictional resistance torque of said rotor and the parts actuated thereby.

4. In an integrating fluid meter, the combination of a jet-nozzle, a rotor operated by the discharge through said jet-nozzle of the fluid to be measured, a resistance member connected and turning with said rotor, a registering device, means affording driving connection between said rotor and the registering device, a constant-torque motor, and means connecting the said constant-torque motor with the rotor member, said constant-torque motor acting to neutralize the frictional resistance torque of said rotor and the parts actuated thereby.

5. In an integrating fluid meter, the combination of a jet-nozzle having a converging, parallel-discharge jet orifice, a rotor provided with blades or buckets, resistance members attached to said rotor, a registering device, means affording driving connection between said rotor and registering device, a constant-torque motor, and means connecting the said constant-torque motor with the rotor member, said constant-torque motor acting to neutralize the frictional resistance torque of said rotor and the parts actuated thereby.

6. In an integrating fluid meter, the combination of a casing, a nozzle having a converging, parallel-discharge jet-orifice, a rotor within the casing provided with blades or buckets and a rotor-shaft, a registering device, means affording driving connection between said shaft and registering device, a constant-torque motor, and means connecting the said constant-torque motor with the rotor shaft, said constant-torque motor acting to neutralize the frictional resistance torque of the rotor-shaft and parts actuated thereby.

7. In an integrating fluid meter, the combination of a rotative motor-member, a shaft therefor, a registering device, means affording driving connection between said shaft and registering device, a rotative drum, a driving connection between said drum and shaft, a cord on said drum and a weight acting on said cord.

8. In an integrating fluid meter, the combination of a casing, a rotor within the casing, a rotor-shaft which extends at one end through the wall of the casing, a registering device, means affording driving connection between said shaft and registering device, a rotative drum, gearing connecting said drum with the end of said shaft exterior to the casing, a cord on said drum and a weight acting on said cord.

9. In an integrating fluid meter, the combination of a casing, a rotor within the casing having an upright rotor-shaft which extends at its upper end through the top wall of the casing, a registering device, an oil-chamber surrounding the upper end of the shaft, an upright, register operating shaft having a bearing at its lower end in said oil-chamber and extending through the top wall of the latter, gearing within the oil-chamber connecting said shafts, operative connections between said register-operating shaft and the registering device, a constant-torque motor, and means connecting the said constant-torque motor with the upper end of said register-operating shaft.

10. In an integrating fluid meter, the combination of a casing, a rotor within the casing, an upright rotor-shaft, an oil chamber above the casing, said oil chamber being separated from the casing by a wall through which said motor-shaft extends, a bearing between said shaft and said wall, a registering device, driving connections between the upper end of said shaft and the registering device, a constant-torque motor, and means connecting said constant-torque motor with said shaft.

11. In an integrating fluid meter, the combination of an oil chamber, a rotative-shaft which passes through a wall of the oil chamber, and a bearing between said shaft and said wall of the oil chamber embracing an annular bearing face on said wall and a disk attached to the shaft within the oil chamber and provided with an annular bearing face in contact with the annular bearing face on said wall, said disk being provided with radial slots extending through the same and in its bearing face, between said slots, with radial oil grooves.

12. In an integrating fluid meter, the combination of an oil chamber, a rotative shaft which passes through a wall of the oil chamber, and a bearing between said shaft and said wall of the oil chamber, consisting of a disk attached to the shaft within the oil chamber and provided with an annular convex bearing surface, said wall being provided with an annular concave bearing surface, and said disk being provided with radial slots extending through the same, and, in its convex bearing face, between the slots, with radial oil grooves.

13. In an integrating fluid meter, the combination of a casing, a rotor within the casing, an upright rotor-shaft which extends at its upper end through the top wall of the casing, an oil-chamber surrounding the upper end of said shaft, a bearing for the upper end of the shaft located within the oil-chamber, a suspension bearing for the shaft consisting of a disk on said shaft which rests and turns on said top wall, and a bearing for the lower end of said shaft embracing a spring-pressed member acting upwardly on the shaft.

14. In an integrating fluid meter, the combination of a casing, a rotor within the casing, an upright rotor-shaft which extends at its upper end through the top wall of the casing, an oil-chamber surrounding the upper end of said shaft, a bearing within the oil-chamber for the upper end of said shaft, a suspension bearing for the shaft consisting of a disk on the shaft which rests and turns upon said top wall, and a bearing for the lower end of said shaft consisting of a bearing sleeve, a vertically sliding bearing-plug in said sleeve engaging the lower end of the shaft, and a lifting spring acting upwardly on said plug.

15. In an integrating fluid meter, the combination of a casing, a rotor within the casing, an upright rotor-shaft which extends at its upper end through the top wall of the casing, an oil-chamber surrounding the upper end of said shaft, a bearing within the oil-chamber for the upper end of said shaft, a suspension bearing for the shaft consisting of a disk on the shaft which rests and turns upon said top wall, and a bearing for the lower end of said shaft consisting of a bearing sleeve provided with an oil space, a vertically sliding bearing plug in said sleeve engaging the lower end of the shaft, and a lifting spring for said plug, said shaft being provided with a longitudinal passage conducting oil from the said oil-chamber to the oil space within the said bearing sleeve.

In testimony, that I claim the foregoing as my invention I affix my signature in the presence of two witnesses, this 23rd day of June A. D. 1909.

EDGAR P. COLEMAN.

Witnesses:
JOHN F. WHALEN,
G. J. BRYCE.